United States Patent
Balta et al.

(10) Patent No.: US 12,092,160 B2
(45) Date of Patent: Sep. 17, 2024

(54) INTEGRATED SEAL AND BEARING ASSEMBLY AND RELATED METHODS

(71) Applicant: Bal Seal Engineering, LLC, Foothill Ranch, CA (US)

(72) Inventors: Miquel Balta, Foothill Ranch, CA (US); Peter Essing, Heemskerk (NL)

(73) Assignee: Bal Seal Engineering LLC, Foothill Ranch, CA (US)

( * ) Notice: Subject to any disclaimer, the term of this patent is extended or adjusted under 35 U.S.C. 154(b) by 0 days.

(21) Appl. No.: 17/821,432

(22) Filed: Aug. 22, 2022

(65) Prior Publication Data
US 2023/0096497 A1     Mar. 30, 2023

Related U.S. Application Data

(60) Provisional application No. 63/247,407, filed on Sep. 23, 2021.

(51) Int. Cl.
*F16C 33/78* (2006.01)

(52) U.S. Cl.
CPC .............................. *F16C 33/7886* (2013.01)

(58) Field of Classification Search
CPC .... F16C 19/06; F16C 33/586; F16C 33/7886; F16C 35/067
See application file for complete search history.

(56) References Cited

U.S. PATENT DOCUMENTS 3,519,316 A * 7/1970 Gothberg .............. F16C 33/768
                                                        277/390
3,658,395 A   4/1972 Hallerback
4,655,945 A   4/1987 Balsells
4,804,290 A   2/1989 Balsells
4,805,943 A   2/1989 Balsells
5,072,070 A  12/1991 Balsells
5,079,388 A   1/1992 Balsells
5,091,606 A   2/1992 Balsells
5,117,066 A   5/1992 Balsells
5,134,244 A   7/1992 Balsells
5,161,806 A  11/1992 Balsells
5,265,890 A  11/1993 Balsells
5,358,224 A  10/1994 Balsells (Continued)

FOREIGN PATENT DOCUMENTS

JP    2012215295 A    11/2012
JP    2015161405 A  *  9/2015  ............ F16C 33/783
JP    6065459 B2      1/2017

OTHER PUBLICATIONS

Machine Translation of JP-2015161405-A (Year: 2015).*
Extended European Search Report from European Patent Office on co-pending EP application (EP22193152.0) dated Jan. 30, 2023.

*Primary Examiner* — Alan B Waits
(74) *Attorney, Agent, or Firm* — Alumen IP Law PC

(57) ABSTRACT

An integrated seal and bearing assemblies with a bearing assembly having an outer ring defining an outside diameter of the bearing assembly and an inner ring defining an inside diameter of the bearing assembly, and having a plurality of rolling elements located between the inner and outer rings. A seal assembly having a sealing element is integrated with the bearing assembly by engaging an extended flange with an internal channel of the seal element, with a sealing extended flange, or directed with complementary surfaces of the outside flange.

18 Claims, 8 Drawing Sheets

(56) References Cited

U.S. PATENT DOCUMENTS

| | | |
|---|---|---|
| 5,370,404 A | 12/1994 | Klein et al. |
| 5,474,309 A | 12/1995 | Balsells |
| 5,575,487 A | 11/1996 | Balsells |
| 5,599,027 A | 2/1997 | Balsells |
| 5,979,904 A | 11/1999 | Balsells |
| 5,984,316 A | 11/1999 | Balsells |
| 5,992,856 A | 11/1999 | Basells et al. |
| 6,050,572 A | 4/2000 | Balsells et al. |
| 6,161,838 A | 12/2000 | Balsells |
| 6,264,205 B1 | 7/2001 | Balsells |
| 6,641,141 B2 | 11/2003 | Schroeder |
| 7,210,398 B2 | 5/2007 | Balsells |
| 7,464,750 B2 | 12/2008 | Schapel et al. |
| 8,096,559 B2 | 1/2012 | Cook |
| 8,328,202 B2 | 12/2012 | Foster et al. |
| 8,544,850 B2 | 10/2013 | Balsells et al. |
| 8,684,362 B2 | 4/2014 | Balsells et al. |
| 9,194,497 B2 | 11/2015 | Rastegar |
| 9,234,591 B2 | 1/2016 | Dilmaghanian et al. |
| 9,285,034 B2 | 3/2016 | Balsells et al. |
| 9,357,684 B2 | 5/2016 | Foster |
| 2010/0237565 A1 | 9/2010 | Foster |
| 2010/0247295 A1 | 9/2010 | Hofmann |
| 2011/0006486 A1 | 1/2011 | Niknezhad |
| 2013/0043661 A1 | 2/2013 | Binder et al. |
| 2014/0312570 A1 | 10/2014 | Foster |
| 2016/0047473 A1 | 2/2016 | Foster et al. |
| 2016/0223086 A1 | 8/2016 | Balsells et al. |
| 2017/0172018 A1* | 6/2017 | Dilmaghanian ..... H05K 9/0015 |
| 2017/0261108 A1 | 9/2017 | Soler et al. |
| 2017/0328474 A1 | 11/2017 | Balsells |
| 2018/0112778 A1 | 4/2018 | Dilmaghanian et al. |
| 2018/0119857 A1 | 5/2018 | Balsells |
| 2018/0266562 A1 | 9/2018 | Balsells |

* cited by examiner

INTEGRATED SEAL AND BEARING ASSEMBLY AND RELATED METHODS

FIELD OF ART

The present disclosure is generally related to bearings and lip seals with specific discussions on integrated seal and bearing assemblies and related methods.

BACKGROUND

Bearings, such as ball bearings and roller bearings, are known for supporting an element, such as a shaft, that rotates within an outer stationary element, such as a housing. Lip seals, which can have an energizer, are known for providing a seal to seal a flow path located between a dynamic surface and a stationary surface, such as a shaft and a housing.

When an application uses both a seal and a bearing, the two are typically spaced or not connected to one another. Further, the seal and the bearing are typically mounted sequentially, one after the other. When used together, the seal is configured to prevent fluid, such as oil, from leaking out from the bearing box that contains the bearing and/or process fluid from leaking into the bearing box.

SUMMARY

Aspects of the present invention are broadly directed to seal and bearing assemblies. The seal and bearing assemblies can be integrated. For example, a seal assembly can engage a bearing assembly directly or can engage one another with an intermediate ring, which has a detent. The engagement forms an integrated seal and bearing assembly.

An aspect of the invention comprises an integrated seal and bearing assembly comprising an outer ring defining an outside diameter of a bearing assembly, an inner ring defining an inside diameter of the bearing assembly, a cage retaining a plurality of rolling elements with said rolling elements contacting the outer ring and the inner ring; a sealing element comprising an outside flange, an inside flange and a center channel section connecting the inside flange and the outside flange, the outside flange, the inside flange, and the center channel section defining a cavity; and an extended flange extending from the outer ring and projecting into an internal channel of the seal element, which is spaced from the cavity.

A further aspect of the invention comprises an integrated seal and bearing assembly comprising an outer ring defining an outside diameter of a bearing assembly, an inner ring defining an inside diameter of the bearing assembly, a cage retaining a plurality of rolling elements with said rolling elements contacting the outer ring and the inner ring; a sealing element comprising an outside flange, an inside flange and a center channel section connecting the inside flange and the outside flange, the outside flange, the inside flange, and the center channel section defining a cavity; and an intermediate ring comprising a body comprising a first ring end and a second ring end defining an extended flange, the extended flange of the intermediate ring projecting into an internal channel of the seal element, which is spaced from the cavity.

A still further aspect of the invention comprises an integrated seal and bearing assembly comprising an outer ring defining an outside diameter of a bearing assembly, an inner ring defining an inside diameter of the bearing assembly, a cage retaining a plurality of rolling elements with said rolling elements contacting the outer ring and the inner ring; a sealing element comprising an outside flange, an inside flange and a center channel section connecting the inside flange and the outside flange, the outside flange, the inside flange, and the center channel section defining a cavity; and an extended flange extending from the outer ring and projecting into the cavity.

A still yet further aspect of the invention comprises an integrated seal and bearing assembly comprising: an outer ring defining an outside diameter of a bearing assembly, an inner ring defining an inside diameter of the bearing assembly, a cage retaining a plurality of rolling elements with said rolling elements contacting the outer ring and the inner ring; a sealing element comprising an outside flange, an inside flange and a center channel section connecting the inside flange and the outside flange, the outside flange, the inside flange, and the center channel section defining a cavity; and an extended flange extending from the outer ring engaging a sealing extended flange extending from the sealing element.

A still further aspect of the invention includes an integrated seal and bearing assembly comprising an outer ring defining an outside diameter of a bearing assembly, an inner ring defining an inside diameter of the bearing assembly, a cage retaining a plurality of rolling elements with said rolling elements contacting the outer ring and the inner ring; a sealing element comprising an outside flange, an inside flange and a center channel section connecting the inside flange and the outside flange, the outside flange, the inside flange, and the center channel section defining a cavity; an extended flange extending from the outer ring engaging a sealing extended flange extending from the sealing element, the extended flange of the outer ring being spaced from the center channel section by a gap; and a support plate separately formed from the bearing assembly and the sealing element located at least partly in the gap.

The support plate can comprise an outside diameter and an inside diameter defining an opening.

The support plate can contact both the extended flange of the bearing assembly and the center channel section of the sealing element.

The integrated seal and bearing assembly can further comprise an energizer located in the cavity.

The energizer can be a canted coil spring, an O-ring, a V-spring, a ribbon spring, or an extension spring.

A support wall can extend from the extended flange of the outer ring and contacting the center channel section of the sealing element.

The outer ring can be fitted into the first ring end of the intermediate ring.

The extended flange can comprise a detent engaging the outside flange of the sealing element.

The outer ring of the bearing assembly can comprise a vertical ring section connected to a horizontal ring section, and wherein the rolling elements can contact the vertical ring section of the outer ring.

The extended flange can comprise an enlarged end with an extended end edge.

The center channel section of the sealing element can contact the extended end edge.

An integrated seal and bearing assembly comprising: an outer ring defining an outside diameter of a bearing assembly, an inner ring defining an inside diameter of the bearing assembly, a cage retaining a plurality of rolling elements with said rolling elements contacting the outer ring and the inner ring; a sealing element comprising an outside flange, an inside flange and a center channel section connecting the inside flange and the outside flange, the outside flange, the inside flange, and the center channel section defining a cavity; and wherein the outer ring and the sealing element are mechanically engaged to one another.

Mechanical engagement, as used herein, refers to an extended flange having a bump engaging complementary surfaces of an adjacent component. In the disclosed FIGS. 1-8, each of the assembly has a mechanical engagement.

An integrated seal and bearing assembly is described located inside a gland, which can be a pump, a blower, a turbine, or other equipment having a shaft movable within a housing. The integrated seal and bearing assembly, which can be referred to as a seal-bearing assembly or "ISB" assembly, can comprise a bearing assembly and a seal assembly that are mechanically coupled to one another.

The coupling can be a detent engagement, such as a latching engagement or a locking arrangement. The ISB assembly and the gland are only partially shown herein about a centerline ¢ as the seal-bearing assembly is understood to have an annulus with an optional energizer located therein.

In an example, the bearing assembly can comprise an outer ring, an inner ring, and a cage for retaining a plurality of rolling elements (only one shown) in spaced spart retaining sockets. The various components of the bearing assembly are typically made from a metal material, which can all be the same material or more likely from a variety of different metal materials.

The inner ring can be configured to tightly fit around the exterior of the shaft and rotate with the shaft along with the rolling elements, which can be held by the cage as the rolling elements rotate with the shaft and the inner ring. The inner ring 122 can have an inside diameter configured to fit around the shaft in an interference fit and an outer diameter, relative to the inside diameter, defining a thickness therebetween. The inner ring has a width ($W_{ir}$), transverse to the thickness, and is sized and shaped to accommodate selected rolling elements.

The outer ring can be tightly fitted against the interior surface of the housing and held stationary to the housing when the inner ring, the cage, and the rolling elements rotate with the shaft. The outer ring can have an inside diameter configured to contact the rolling elements and an outer diameter configured to fit against the housing.

The inside diameter and the outside diameter of the outer ring define a thickness therebetween. The outer ring has a width ($W_{or}$), transverse to the thickness, and is sized and shaped to accommodate selected rolling element types. As further discussed below and in an exemplary embodiment, the outer ring width $W_{or}$ is wider than the inner ring width $W_{ir}$.

The outer ring of the bearing assembly can comprise an extended flange extending from a side edge of the outer ring. The extended flange can comprise a base section and a bump defining a detent for engaging a corresponding detent of the seal assembly, as further discussed below. In an example, the outer ring is unitarily formed with the extended flange. In yet another example, a separately formed extended flange can snap fit with the outer ring, or be welded to the outer ring.

In an example, the bearing assembly is a ball bearing assembly and the rolling elements are metal balls or spherical balls. When the bearing assembly is a ball bearing assembly, the outer and inner rings can comprise inner and outer bearing races for the plurality of balls to contact and rotate against. In other examples, the bearing assembly can be a different bearing type, such as a roller bearing assembly, a tapered or angled roller bearing assembly, a thrust ball bearing assembly or a roller bearing assembly, etc. Rolling elements of a roller bearing assembly and tapered roller bearing assembly can embody solid rotating cylinders or solid tapered cylinders.

The outer ring of the bearing assembly can comprise two exterior grooves defining raised projections. In other examples, one or more than two exterior grooves and two or more than three raised projections can be incorporated. For each projection, relatively smaller grooves, such as microgrooves, can be provided on the exterior thereof to facilitate assembly of the outer ring into the bore of the housing. The grooves, when incorporated, reduce interference and friction and facilitate assembly.

A seal assembly provided herein can comprise a seal element comprising an inside flange, an outside flange, and a center channel section connecting the inner and outer flanges and defining a cavity therebetween, which can accommodate an energizer.

The seal element can be made from a non-metallic material, such as being made from an elastomeric material or thermoplastic elastomer material.

In an exemplary embodiment, the energizer is a canted coil spring comprising a plurality of interconnected coils all canted generally in the same direction and can deflect by further canting and uncanting the plurality of interconnected coils along the same general canting angle. The canted coils operate to bias the inner and outer flanges away from one another to press and seal against the shaft and the housing, respectively. In other examples, the energizer can be an O-ring or a different metallic spring type, such as a ribbon spring, a V-spring, or a helical compression or extension spring. In some examples, such as in relatively low pressure applications, the energizer can be omitted.

In some examples, rather than biasing against the inner and outer flanges of the seal element, the energizer can bias against one of the flanges of the seal element and against part of the bearing element or part of an intermediate ring, as further discussed below.

The inside flange of the sealing element has an inside diameter for placing around the shaft and a sealing lip that is pressed against the shaft surface to provide a dynamic seal, when the shaft moves or rotates. The sealing lip that seals against a dynamic surface, such as the shaft, can have a long dynamic surface that is about 26% to about 65% of the length of the inside flange or a short dynamic surface that is about 5% to about 25% of the length of the inside flange. The sealing lip can be biased by the energizer against the surface of the shaft. As shown, the energizer is a canted coil spring, which has an operating working deflection range and provides a generally constant biasing force over a deflection range so that forces remain generally constant at the sealing interfaces should the shaft vibrate.

An internal channel can be provided through the center channel section and part of the outside flange of the seal element. The internal channel is spaced from the cavity. That is, each of the internal channel and the cavity is bounded by a surface so that the space of the internal channel and the space of the cavity are separated from one another.

The outside flange can have a thickness and wherein the internal channel can be formed through at least part of the thickness of the outside flange and through the thickness or width of the center channel section. Assuming that the center channel section of the seal element accounts for the entire vertical portion of the seal element, the internal channel can be formed through the entire width of the center channel section and through the thickness of at least part of the length of the outer flange.

The internal channel may have complementary internal surfaces to complement the extended flange of the bearing assembly. In an example, the internal channel can include surfaces to enable detent engagement with the extended flange.

The extended flange of the bearing assembly can extend into the internal channel of the seal element to mechanically engage with the seal assembly. The center channel section can have an edge, such as a left edge or a first edge, defining a vertical plane and the extended flange can project from a first side of the plane, through the plane, and into the second side of the plane.

In an example, the extended flange of the outer ring can extend into the internal channel and mechanically engage mating features of the internal channel of the seal element in a latching engagement, which allows separation of the seal assembly and bearing assembly, or a locking engagement, which does not allow separation between the two components.

In the configuration shown, the orientation of the integrated seal and bearing assembly or ISB assembly can be aligned so that the seal assembly faces or is closest to the relatively higher pressure region and the bearing assembly faces or is closest to the relatively lower pressure region. However, in other instances, the arrangement can be reversed or the two regions can have the same pressure. For example, the bearing assembly can be located in an oil sump of a bearing housing and the seal assembly is configured to prevent oil leakage from inside the bearing box out into the environment.

The integrated seal and bearing assembly supports and reduces friction as the shaft rotates and seals potential leakage path between the shaft and the housing. Additionally, the integrated design provides a compact assembly, along a lengthwise direction of the shaft, as well as a single assembly for installation and maintenance purposes. Compared to similarly sized bearing assemblies and seal assemblies that are not integrated, the serial arrangement of such assemblies will occupy more space than the ISB assembly in accordance with aspects of the invention.

Note that the direction of arrangement of the ISB assembly is not limited. For example, the ISB assembly can be practiced with the seal assembly follow by the bearing assembly or in reverse, looking from left to right. The arrangement can depend on several factors and configurations, such as whether the ISB assembly is used on the inboard or outboard end of the gland.

For integrated seal and bearing assemblies disclosed herein, which include a bearing assembly and a seal assembly that directly contact one another or indirectly contact one another via an intermediate ring that is removable from the gland with the seal and bearing assemblies, as described herein, it is understood that where a feature is shown but not expressly described and is otherwise the same or similar to the feature or features described elsewhere, such as with reference to FIG. 1, the disclosed part or parts shown in the drawing figures but not expressly described because of redundancy and because knowledge is built on a foundation laid by earlier disclosures may nonetheless be understood to be described or taught by the same or similar features expressly set forth in the text for the embodiments in which the feature or features are described.

Said differently, subsequent discussions of the present application are built upon the foundation of earlier discussions unless the context indicates otherwise. The application disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following integrated seal and bearing assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

An ISB assembly in accordance with further aspects of the invention cam be similar to the ISB assembly of FIG. 1 with a few exceptions or differences. In an example, the outer ring of the bearing assembly does not include an extended flange and the outer ring does not directly contact the seal assembly via the extended flange. Thus, the width of the outer ring and the width of the inner ring of the bearing assembly of the alternative embodiment are about the same without the extended flange.

The bearing assembly can indirectly contact the seal assembly via an intermediate ring. The intermediate ring can be made from a metal material or an engineered plastic, such as Polyether ether ketone (PEEK), Polyetherketoneketone (PEKK), Polyetherketone (PEK), and Polyketone (PK).

The intermediate ring, which can have sections or portions located between or intermediate the seal assembly and the bearing assembly, has a body comprising a first ring end and a second ring end connected to one another by a joining wall. The intermediate ring can be unitarily formed with the first ring end, the second ring end, and the joining wall. The first ring end can have a generally cylindrical shaped wall configured to fit against the interior surface of the gland housing via an interference fit. The ID of the first ring end can be configured to receive the outer ring of the bearing assembly, also in an interference fit.

In addition to joining the first ring end and the second ring end, the joining wall can provide a reference point or plane, which is a physical reference plane, for which to push the bearing assembly against during installation. In particular, the joining wall can extend radially inwardly from the first ring end a sufficient distance so that an end edge of the outer ring can abut against the joining wall to fully seat the outer ring within the first ring end.

The second ring end of the body can have an extended flange. The extended flange of the second ring end can have a base portion and a bump defining a detent for engaging corresponding surfaces of the internal cavity of the seal element. The second ring end of the intermediate ring extends into internal cavity to mechanically engage with the seal element of the seal assembly, which can have a matching or mating detent, or complementary surfaces.

Thus, an integrated seal and bearing assembly in accordance with aspects of the present invention can have a seal assembly, an intermediate ring, and a bearing assembly. An energizer can optionally be used with the seal element, in a cavity of the sealing element, depending on the application.

A support wall can extend radially inwardly from the second ring end below the joining wall towards the center of the ISB assembly. Viewed differently, the joining wall can include a cut-out or recess to define a support wall. The recess or cut-out can space the support wall from the inner ring of the bearing assembly so that the inner ring does not abut or contact the support wall.

The support wall provides a reference point or plane for the center channel section of the seal assembly to contact therewith or thereagainst. The support wall can therefore provide support for the center channel section in the event pressure pushes the center channel section, and therefore the seal element, in the direction of the bearing assembly. For example, if the service environment has a high pressure region and a relatively lower pressure region, then the high pressure may tend to extrude or push the seal element, and particularly the center channel section, in the direction of the lower pressure region. The support wall therefore provides support and bracing for the seal element to resist extrusion, also known as high pressure extrusion.

An ISB assembly in accordance with further aspects of the invention has an extended flange for engaging the internal channel of the seal assembly. The extended flange extends from the bearing assembly, and specifically from the outer ring of the bearing assembly. A support wall is provided to support the center channel section of the seal element from high pressure extrusion. The support wall can extend radially inwardly from the extended flange and is therefore part of the outer ring. The outer ring of the bearing assembly can be unitarily formed with an extended flange having a detent and a support wall. The extended flange can engage complementary surfaces of the internal channel and the support wall can support the seal element from high pressure extrusion, as previously described.

An ISB assembly in accordance with still further aspects of the invention is shown. The ISB assembly has a support wall 180 extending radially inwardly of the extended flange is relatively shorter or smaller than the length of the support wall 180 of other embodiments described herein. Although shorter, the support wall still supports the seal assembly, such as the center channel section, from high pressure extrusion. Thus, the support walls described herein has a radially inwardly extending length that is a variable that can be adjusted, such as machined to have particular or desired length within a range of lengths, and still support the seal assembly from high pressure extrusion.

An ISB assembly in accordance with yet further aspects of the invention does not incorporate an internal channel. Instead, the cavity defined by the inside flange, the outside flange, and the center channel section of the seal element is oriented to face the bearing assembly and the extended flange of the bearing assembly projects into the cavity to engage the outer flange. Said differently, the present embodiment has a bearing assembly with an outer ring comprising an extended flange and wherein the extended flange extends from a first side of a vertical plane and across the vertical plane into the seal element. Further, because the extended flange is located in the cavity of the seal element, the shape of the cavity is modified by the physical presence of the extended flange. Said differently, the extended flange and the cavity together define a working cavity in which the energizer biases directly against the extended flange and the inside flange to bias the two in opposite directions.

In an example, the extended flange of the outer ring of the bearing assembly has a lower surface opposite the surface with the detent. The shaped lower surface has an angled end section to assist with confining the plurality of coils of the canted coil spring to prevent tilting or rotating during assembly and during service. In other examples, the shaped lower surface and the angled end section can be sized and shaped to move the minor axis of each of the coils, which is the shorter of the two axes of the elliptical shaped coils, more directly over the seal lip of the inner flange. This can allow the minor axes of the plurality of coils of the canted coil spring to act more directly on the sealing lip, which can have a long dynamic sealing lip or a short dynamic sealing lip.

An ISB assembly in accordance with still further aspects of the invention has an extending flange that projects into the cavity of the sealing element and mechanically engages with the outside flange, such as in a latching engagement or locking engagement. The outer flange can have a shaped lower surface with an angled end section for confining the position of the coils of the canted coil spring. As shown, the lower surface of the outer flange is generally planar.

In an example, the outer ring has a vertical ring section that extends from a generally horizontal ring section and has a connecting corner with surfaces that are approximately at right angle, on the side adjacent the energizer. The vertical ring section enables the ISB assembly designer to select the desired gap between the vertical ring section and the inner ring, which can vary with the desired ball size or rotating element and cage.

A plurality of through holes (only one shown) can be provided through the vertical ring section. Each of the through holes has two open ends. In an example, two or more through holes or passages are provided in the vertical ring section of the outer ring. In other examples, there can be more than two through holes, such as three, four, five, or more than five through holes. Less preferably, only one through hole is provided through the vertical ring section.

Each through hole or passage has two open ends and a passage to enable fluid to pass from a first side of the vertical ring section to a second side of the vertical ring section. In use, pressure from the high pressure region can pass through the plurality of through holes to equalize pressure across the bearing assembly. Further, as pressure is equalized in the cavity space of the seal element, fluid pressure aids to further bias the inner flange against the shaft surface to increase the sealing pressure of the inner flange against the shaft surface. The inner flange can have a long dynamic sealing lip or a short dynamic sealing lip.

In yet another ISB assembly in accordance with further aspects of the invention, the outer ring comprises an extended flange that has both a base and a bump defining a detent for engaging a corresponding detent on the seal assembly, as further discussed below.

In the present embodiment, the seal assembly does not incorporate an internal channel with complementary surfaces for engaging the detent of the extended flange. Instead, a sealing extended flange is provided with the sealing element. The sealing extended flange extends from the center channel section in the axial direction, axially relative to the lengthwise axis of the shaft. The sealing extended flange can extend towards the bearing assembly and away from the cavity. The sealing extended flange comprises a base and a bump defining a detent having complementary surfaces for engaging the detent of the extended flange of the bearing assembly. Thus, in the present embodiment, the seal assembly directly contacts and engages the bearing assembly and wherein each of the two assemblies comprises an extended flange with a detent.

To adjust the size and shape of the cavity of the sealing element for accommodating an energizer of desired size, the outer flange can be made relative thicker than the inside flange. Having a relatively thinner inside flange allows the inside flange to flex with the shifting shaft, such as when the shaft vibrates up and down, and maintain the dynamic seal. With the ability to adjust the thickness of the outer flange, different sized spring energizers can be used with the ISB assembly.

In an example, a support plate is included with the seal assembly and is provided between the seal element and the bearing assembly. The support plate, when incorporated, can have an outside diameter and an inside diameter, and wherein the inside diameter defines an opening for accommodating the shaft. The opening should have enough clearance to easily mount over the shaft. In an example, the support plate is a metallic washer and wherein the thickness of the support plate can be a variable to fit within the space between the center channel section of the seal element and the end of the extended flange.

In another example, the support plate is made from a non-metallic material, such as engineered plastic or other appropriate non-metallic material appropriate for the application. The support plate has a support wall for supporting the seal element, and specifically the center channel section of the seal element, from high pressure extrusion. The support plate can abut the rigid extended flange to provide a rigid support wall to support the seal element from high pressure extrusion, in the direction of the bearing assembly.

In yet another embodiment, an ISB assembly has an extended flange extending from the outer ring of the bearing assembly that is provided with an enlarged end having an extended end edge. In an example, the extended end edge contacts the center channel section of the seal assembly to support the seal assembly from high pressure extrusion. Thus, the extended end edge of the enlarged end of the extended flange can act like a support wall of other ICB assemblies discussed elsewhere herein.

A still further aspect of the invention is a method of using an integrated seal and bearing assembly as shown and described.

A still further aspect of the invention is a method of manufacturing or making an integrated seal and bearing assembly as shown and described.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of integrated seal and bearing assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Figure 1:
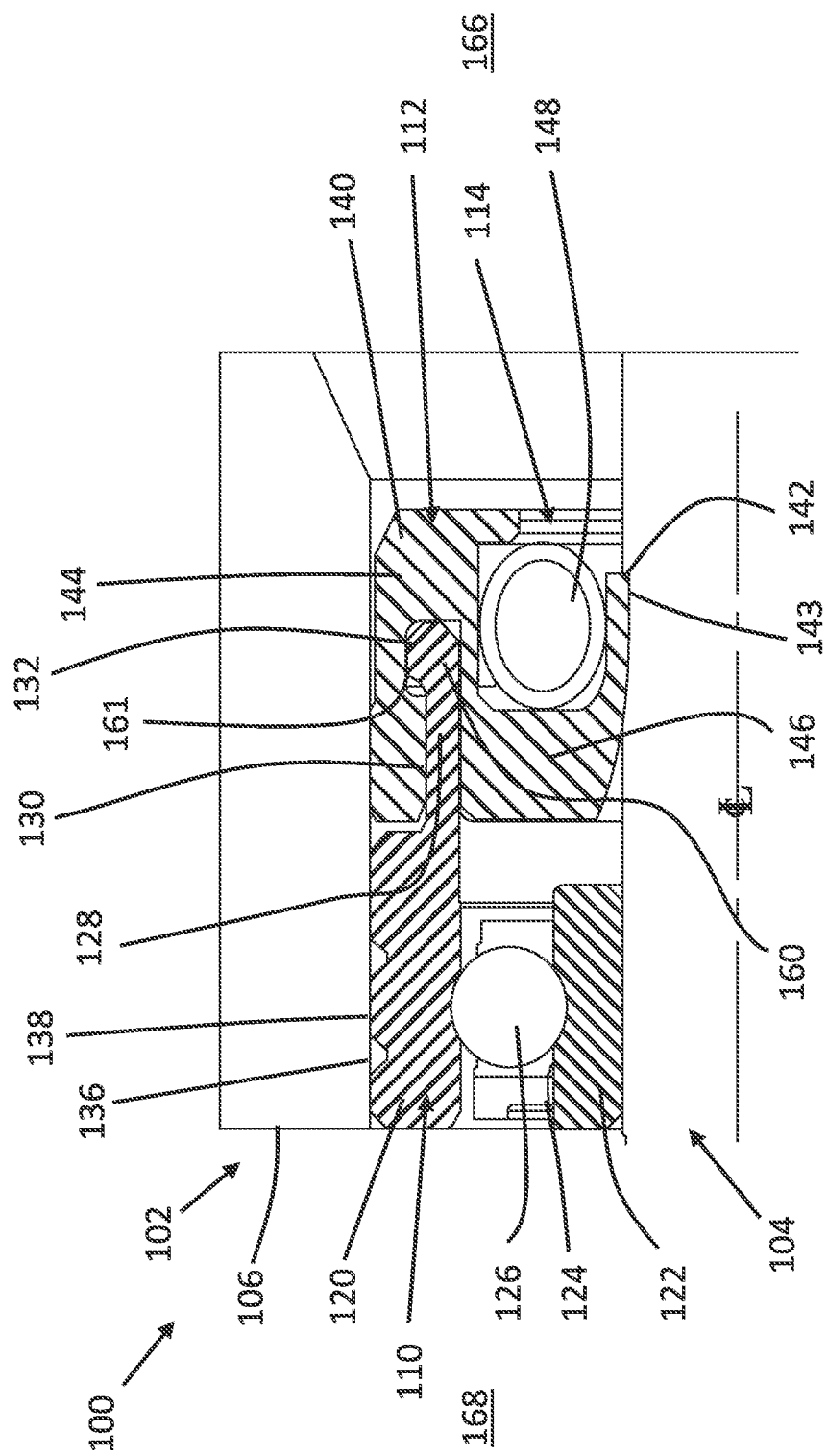
FIG. 1 is a schematic cross-sectional side view of an integrated seal and bearing assembly located in a gland.

With reference now to FIG. 1, an integrated seal and bearing assembly 100 is shown located inside a gland 102, which can be a pump, a blower, a turbine, or other equipment having a shaft 104 movable within a housing 106. The integrated seal and bearing assembly 100, which can be referred to as a seal-bearing assembly or "ISB" assembly, comprises a bearing assembly 110 and a seal assembly 112 that are mechanically coupled to one another in a detent engagement, such as a latching engagement or a locking arrangement, as further discussed below. The ISB assembly 100 and the gland 102 are only partially shown about a centerline ¢ as the seal-bearing assembly is understood to have an annulus with an optional energizer 114 located therein.

In an example, the bearing assembly 110 comprises an outer ring 120, an inner ring 122, and a cage 124 for retaining a plurality of rolling elements 126 (only one shown) in spaced spart retaining sockets. The various components of the bearing assembly 100 are typically made from a metal material, which can all be the same material or more likely from a variety of different metal materials. The inner ring 122 is configured to tightly fit around the exterior of the shaft 104 and rotate with the shaft along with the rolling elements 126, which are held by the cage 124 as they rotate with the shaft in spaced apart relationship. The inner ring 122 can have an inside diameter configured to fit around the shaft in an interference fit and an outer diameter, relative to the inside diameter, defining a thickness therebetween. The inner ring 122 also has a width ($W_{ir}$) and is sized and shaped to accommodate selected rolling elements.

The outer ring 120 is tightly fitted against the interior surface of the housing 106 and is held stationary to the housing when the inner ring 122, the cage 124, and the rolling elements 126 rotate with the shaft 104. The outer ring 120 can have an inside diameter configured to contact the rolling elements 126 and an outer diameter configured to fit against the housing 106. The inside diameter and the outside diameter of the outer ring 120 define a thickness therebetween. The outer ring 120 has a width ($W_{or}$) and is sized and shaped to accommodate selected rolling element types. As shown and as further discussed below, the outer ring 120 width $W_{or}$ is wider than the inner ring width $W_{ir}$, and the outer ring comprising an extended flange 128 extending from a side edge of the outer ring 120. The extended flange 128 can comprise a base section 130 and a bump 132 defining a detent for engaging a corresponding detent of the seal assembly 112, as further discussed below. In an example, the outer ring 120 is unitarily formed with the extended flange 128. In yet another example, a separately formed extended flange 128 can snap fit with the outer ring 120, or be welded to the outer ring.

In an example, the bearing assembly 110 is a ball bearing assembly and the rolling elements 126 are metal balls or spherical balls. When the bearing assembly 110 is a ball bearing assembly, the outer and inner rings 120, 122 can comprise inner and outer bearing races for the plurality of balls 126 to contact and rotate against. In other examples, the bearing assembly 100 can be a different bearing type, such as a roller bearing assembly, a tapered or angled roller bearing assembly, a thrust ball bearing assembly or a roller bearing assembly, etc. Rolling elements of a roller bearing assembly and tapered roller bearing assembly can embody solid rotating cylinders or solid tapered cylinders.

As shown, the outer ring 120 comprises two exterior grooves 136 defining three raised projections 138. In other examples, one or more than two exterior grooves and two or more than three raised projections can be incorporated. Further, for each projection 138, relatively smaller grooves, such as micro-grooves, can be provided on the exterior thereof to facilitate assembly of the outer ring 130 into the bore of the housing 106. The grooves 136, when incorporated, reduce interference and friction and facilitate assembly.

The seal assembly 112 comprises a seal element 140 comprising an inside flange 142, an outside flange 144, and a center channel section 146 connecting the inner and outer flanges and defining a cavity 148 therebetween, which can accommodate an energizer 114. The seal element 140 is non-metallic and may be made from an elastomeric material or thermoplastic elastomer material. In the embodiment shown, the energizer 114 is a canted coil spring comprising a plurality of interconnected coils all canted generally in the same direction and the coils operate to bias the inner and outer flanges 142, 144 away from one another to press and seal against the shaft 104 and the housing 106, respectively. In other examples, the energizer 114 can be an O-ring or a different metallic spring type, such as a ribbon spring, a V-spring, or a helical compression or extension spring. In some examples, such as in relatively low pressure applications, the energizer can be omitted.

As shown, the inside flange 142 of the sealing element 140 has an inside diameter for placing around the shaft 104 and a sealing lip 143 that is pressed against the shaft surface to provide a dynamic seal, when the shaft moves or rotates. The sealing lip 143 can have a long dynamic surface that is about 26% to about 65% of the length of the inside flange 142 or a short dynamic surface that is about 5% to about 25% of the length of the inside flange. The scaling lip 143 can be biased by the energizer 114 against the surface of the shaft 104. As shown, the energizer is a canted coil spring, which has an operating working deflection range and provides a generally constant biasing force over a deflection range so that forces remain generally constant at the sealing interfaces should the shaft vibrate.

An internal channel 160 is provided through the center channel section 146 and part of the outside flange 144 of the seal element 140. The internal channel 160 is spaced from the cavity 148. That is, the outside flange 144 has a thickness and wherein the internal channel 160 is formed through at least part of the thickness of the outside flange 144 and through the thickness or width of the center channel section 146. Assuming that the center channel section 146 of the seal element 140 accounts for the entire vertical portion of the seal element, the internal channel 160 is formed through the entire width of the center channel section 146 and through the thickness of at least part of the length of the outer flange 144. The internal channel 160 may have complementary internal surfaces 161 to complement the extended flange 128 of the bearing assembly. In an example, the internal channel 160 can include surfaces to enable detent engagement with the extended flange 128.

As shown, the extended flange 128 of the bearing assembly 110 extends into the internal channel 160 of the seal element 140 to mechanically engage with the seal assembly 112. The center channel section 146 can have a left edge defining a vertical plane and the extended flange 128 can project from a first side of the plane, through the plane, and into the second side of the plane. Specifically, the extended flange 128 of the outer ring 120 can extend into the internal channel 160 and mechanically engage mating features of the internal channel 160 of the seal element 140 in a latching engagement, which allows separation of the seal assembly and bearing assembly, or a locking engagement, which does not allow separation between the two components.

In the configuration shown, the orientation of the integrated seal and bearing assembly or ISB assembly 100 is aligned so that the seal assembly 112 faces or is closest to the relatively higher pressure region 166 and the bearing assembly 110 faces or is closest to the relatively lower pressure region 168. However, in other instances, the arrangement can be reversed or the two regions 166, 168 can have the same pressure. For example, the bearing assembly 110 can be located in an oil sump 168 of a bearing housing and the seal assembly 112 is configured to prevent oil leakage from inside the bearing box out into the environment 166. The integrated seal and bearing assembly 100 supports and reduces friction as the shaft rotates and seals potential leakage path between the shaft and the housing. Additionally, the integrated design provides a compact assembly, along a lengthwise direction of the shaft, as well as a single assembly for installation and maintenance purposes. Compared to similarly sized bearing assemblies and seal assemblies that are not integrated, the serial arrangement of such assemblies will occupy more space than the ISB assembly in accordance with aspects of the invention.

Note that the direction of arrangement of the ISB assembly is not limited to the configuration shown. For example, looking from left to right of FIG. 1, the ISB assembly can be practiced with the seal assembly 112 follow by the bearing assembly 110. The arrangement depends on several factors and configurations, such as whether the ISB assembly is used on the inboard or outboard end of the gland 102.

For integrated seal and bearing assemblies 100 disclosed herein, which include a bearing assembly and a seal assembly that directly contact one another or indirectly contact one another via an intermediate ring that is removable from the gland with the seal and bearing assemblies, as described herein, it is understood that where a feature is shown but not expressly described and is otherwise the same or similar to the feature or features described elsewhere, such as above with reference to FIG. 1, the disclosed part or parts shown in the drawing figures but not expressly described because of redundancy and because knowledge is built on a foundation laid by earlier disclosures may nonetheless be understood to be described or taught by the same or similar features expressly set forth in the text for the embodiments in which the feature or features are described. Said differently, subsequent discussions of the present application are built upon the foundation of earlier discussions unless the context indicates otherwise. The application disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following integrated seal and bearing assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

Figure 2:
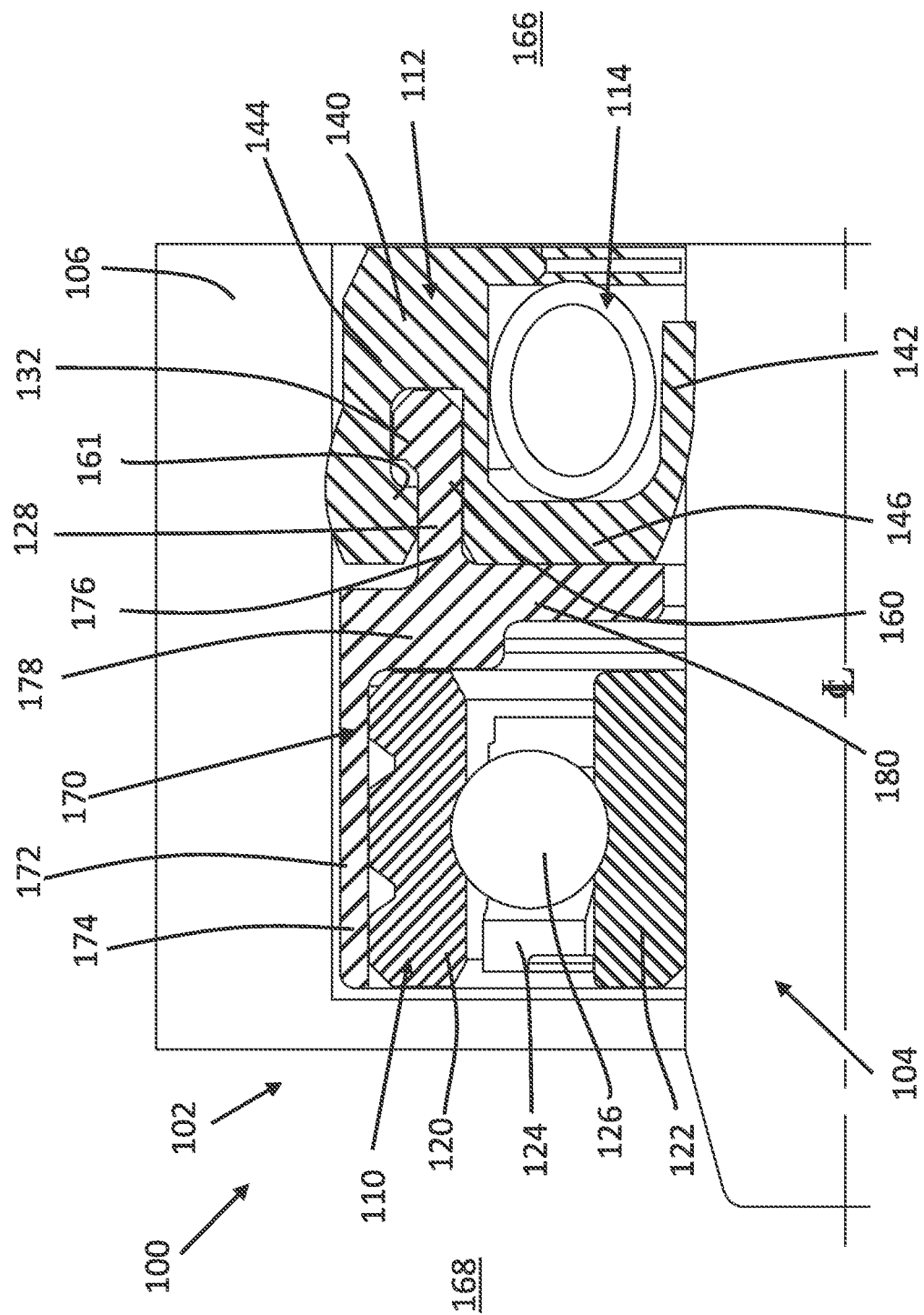
FIG. 2 is a schematic cross-sectional side view of an integrated seal and bearing assembly located in a gland in accordance with further aspects of the invention.

With reference now to FIG. 2, an ISB assembly 100 in accordance with further aspects of the invention is shown. The present ISB assembly 100 is similar to the ISB assembly of FIG. 1 with a few exceptions or differences. In the present embodiment, the outer ring 120 of the bearing assembly 110 does not include an extended flange and the outer ring does not directly contact the seal assembly via the extended flange. Thus, the width of the outer ring 120 and the width of the inner ring 122 of the bearing assembly 110 are about the same without the extended flange.

In the present embodiment, the bearing assembly 110 is indirectly contacting the seal assembly 112 via an intermediate ring 170, which can be made from a metal material or an engineered plastic, such as Polyether ether ketone (PEEK), Polyetherketoneketone (PEKK), Polyetherketone (PEK), and Polyketone (PK). The intermediate ring 170, which has sections or portions located between or intermediate the seal assembly 112 and the bearing assembly 110, has a body 172 comprising a first ring end 174 and a second ring end 176 connected to one another by a joining wall 178. The intermediate ring 170 can be unitarily formed with the first ring end, the second ring end, and the joining wall. The first ring end 174 has a generally cylindrical shaped wall configured to fit against the interior surface of the gland housing 106 via an interference fit. The ID of the first ring end 174 is configured to receive the outer ring 120 of the bearing assembly 110, also in an interference fit.

In addition to joining the first ring end 174 and the second ring end 176, the joining wall 178 provides a reference point or plane, which is a physical reference plane, for which to push the bearing assembly 110 against during installation. In particular, the joining wall 178 extends radially inwardly from the first ring end 174 a sufficient distance so that an end edge of the outer ring 120 can abut against the joining wall 178 to fully seat the outer ring 120 within the first ring end 174.

The second ring end 176 of the body 172 has an extended flange 128 similar to that of FIG. 1. The extended flange of the second ring end 176 has a base portion 128 and a bump 132 defining a detent for engaging corresponding surfaces of the internal cavity 160 of the seal element 140. The second ring end 176 of the intermediate ring 170 extends into internal cavity 160 to mechanically engage with the seal element 140 of the seal assembly 112, which has a matching or mating detent, or complementary surfaces 161. The present integrated seal and bearing assembly 100 therefore has a seal assembly, an intermediate ring, and a bearing assembly. An energizer 114 can optionally be used with the seal element depending on the application.

A support wall 180 can extend radially inwardly from the second ring end 176 below the joining wall 178 towards the center of the ISB assembly. Viewed differently, the joining wall 178 can include a cut-out or recess to define a support wall 180. The recess or cut-out spaces the support wall 180 from the inner ring 122 of the bearing assembly 110 so that the inner ring does not abut or contact the support wall. The support wall 180 provides a reference point or plane for the center channel section 146 of the seal assembly 112 to contact therewith or thereagainst. The support wall 180 can therefore provide support for the center channel section 146 in the event pressure pushes the center channel section, and therefore the seal element, in the direction of the bearing assembly. For example, if the region indicated at 166 is a high pressure region and the region indicated at 168 is a relatively lower pressure region, then the high pressure may tend to extrude or push the seal element 140, and particularly the center channel section 146, in the direction of the lower pressure region 168. The support wall 180 therefore provides support and bracing for the seal element to resist extrusion, also known as high pressure extrusion.

Figure 3:
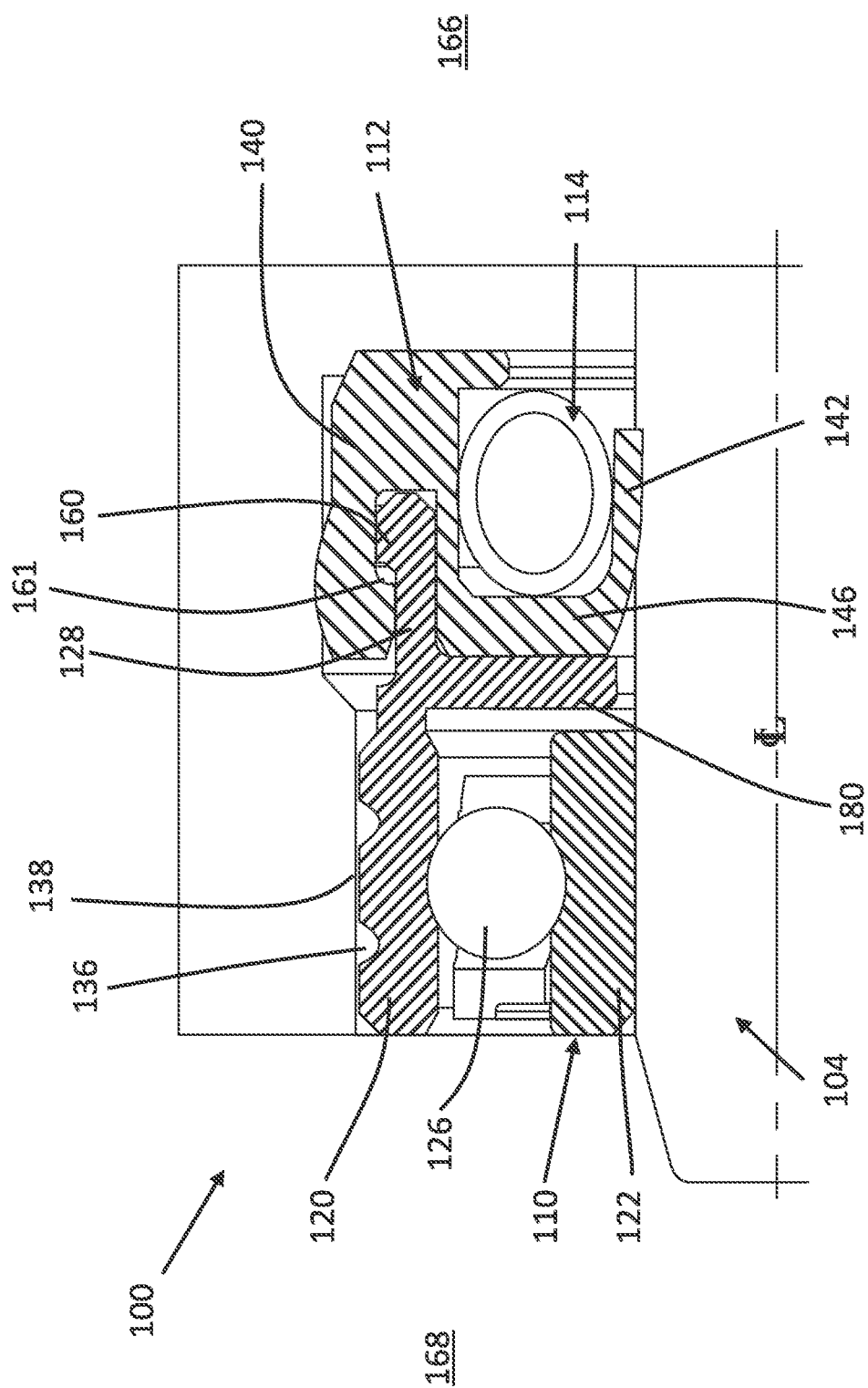
FIG. 3 is a schematic cross-sectional side view of an integrated seal and bearing assembly located in a gland in accordance with still further aspects of the invention.

With reference now to FIG. 3, an ISB assembly 100 in accordance with further aspects of the invention is shown. The present ISB assembly 100 is similar to the ISB assembly of FIG. 1 and the ISB assembly of FIG. 2 with a few exceptions or differences. An intermediate ring is not incorporated with the present embodiment. Thus, the extended flange 128 for engaging the internal channel 160 of the seal assembly 112 extends from the bearing assembly 110, and specifically from the outer ring 120 of the bearing assembly, like that of FIG. 1. However, a support wall 180 like that of FIG. 2 and unlike that of FIG. 1 is provided to support the center channel section 146 of the seal element 140 from high pressure extrusion. The support wall 180 extends radially inwardly from the extended flange 128 and is therefore part of the outer ring 120. Said differently, the outer ring 120 of the bearing assembly 110 can be unitarily formed with an extended flange 128 having a detent and a support wall 180. The extended flange 128 can engage complementary surfaces 161 of the internal channel 160 and the support wall 180 can support the seal element 140 from high pressure extrusion, as previously described.

Figure 4:
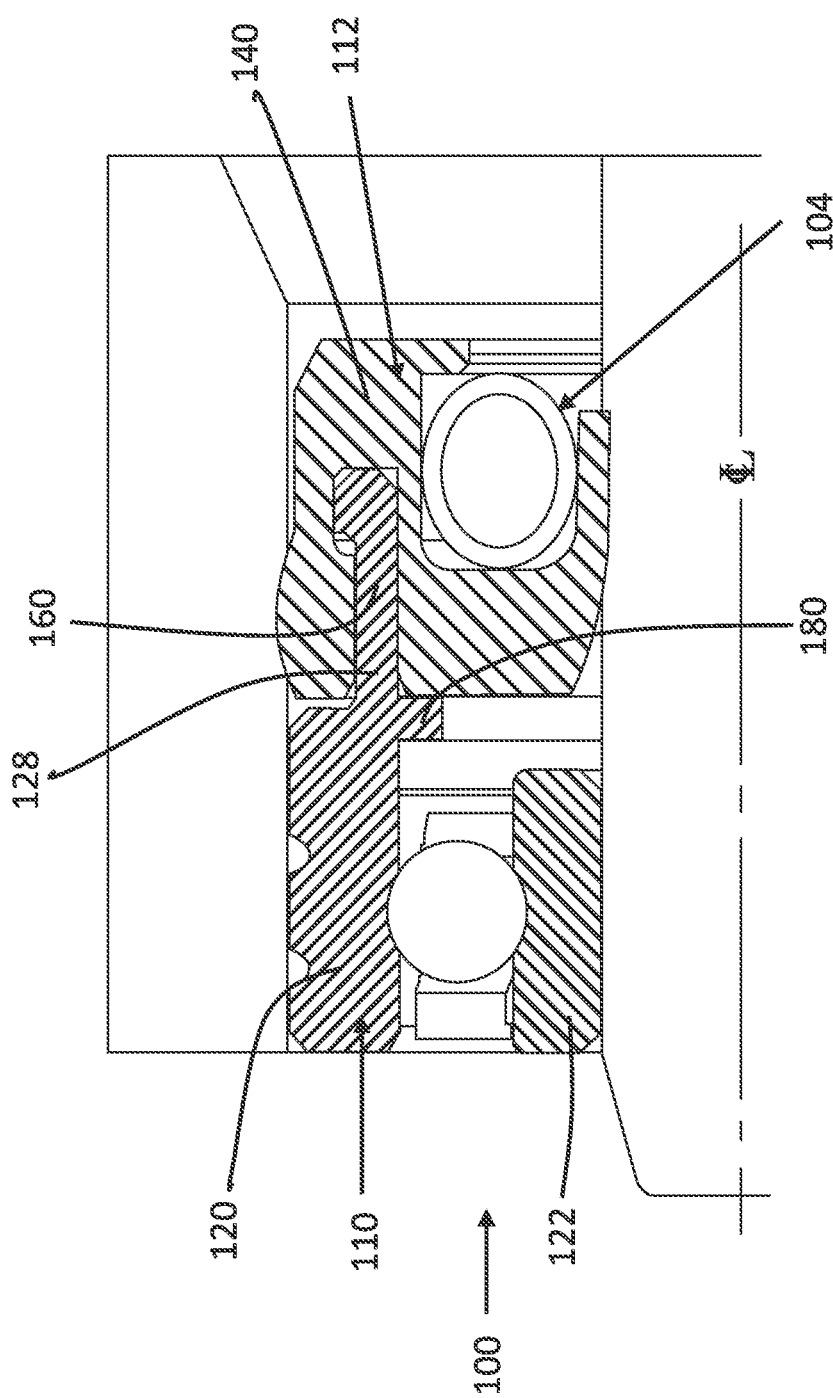
FIG. 4 is a schematic cross-sectional side view of an integrated seal and bearing assembly located in a gland in accordance with still further aspects of the invention.

With reference now to FIG. 4, an ISB assembly 100 in accordance with further aspects of the invention is shown. The present ISB assembly 100 is similar to the ISB assembly of FIG. 3, and therefore similar to the ISB assemblies of FIGS. 1 and 2, with a few exceptions. In the present embodiment, the support wall 180 extending radially inwardly of the extended flange 128 is relatively shorter or smaller than the length of the support wall 180 of FIG. 3. Although shorter, the support wall 180 of FIG. 4 still supports the seal assembly, such as the center channel section, from high pressure extrusion. Thus, the support walls of FIGS. 3 and 4 demonstrate that the length of the support walls is a variable that can be adjusted, such as machined to have particular or desired length within a range of lengths, and still support the seal assembly from high pressure extrusion.

Figure 5:
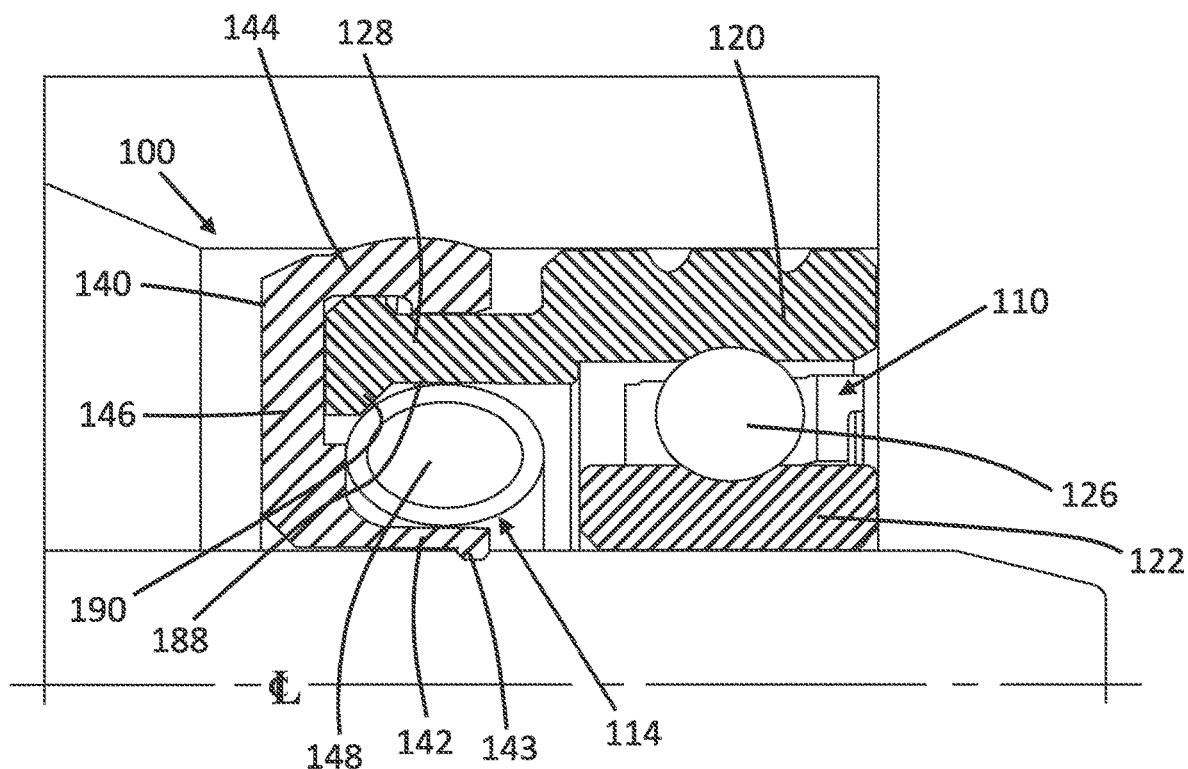
FIG. 5 is a schematic cross-sectional side view of an integrated seal and bearing assembly located in a gland in accordance with still further aspects of the invention.

With reference now to FIG. 5, an ISB assembly 100 in accordance with further aspects of the invention is shown, which is similar to the ISB assembly 100 of FIG. 1 with a few exceptions or differences. In the present embodiment, the seal element 140 does not incorporate an internal channel 160 like that of FIG. 1. Instead, the cavity 148 defined by the inside flange 142, the outside flange 144, and the center channel section 146 of the seal element 140 is oriented to face the bearing assembly 110 and the extended flange 128 of the bearing assembly 110 projects into the cavity 148 to engage the outer flange 144. Said differently, the present embodiment, similar to the embodiment of FIG. 1, has a bearing assembly 110 with an outer ring 120 comprising an extended flange 128 and wherein the extended flange extends from a first side of a vertical plane and across the vertical plane into the seal element. Further, because the extended flange 128 is located in the cavity 148 of the seal element 140, the shape of the cavity 148 is modified by the physical presence of the extended flange 128. Said differently, the extended flange 128 and the cavity 148 together define a working cavity in which the energizer 114 biases directly against the extended flange 128 and the inside flange 142 to bias the two in opposite directions.

In an example, the extended flange 128 of the outer ring 120 of the bearing assembly 110 has a lower surface 188 opposite the surface with the detent. The shaped lower surface 188 has an angled end section 190 to assist with confining the plurality of coils of the canted coil spring 114 to prevent tilting or rotating during assembly and during service. In other examples, the shaped lower surface 188 and the angled end section 190 can be sized and shaped to move the minor axis of each of the coils, which is the shorter of the two axes of the elliptical shaped coils, more directly over the seal lip 143 of the inner flange 142. This allows the minor axes of the plurality of coils to act more directly on the sealing lip 143, which can have a long dynamic sealing lip or a short dynamic scaling lip.

Figure 6:
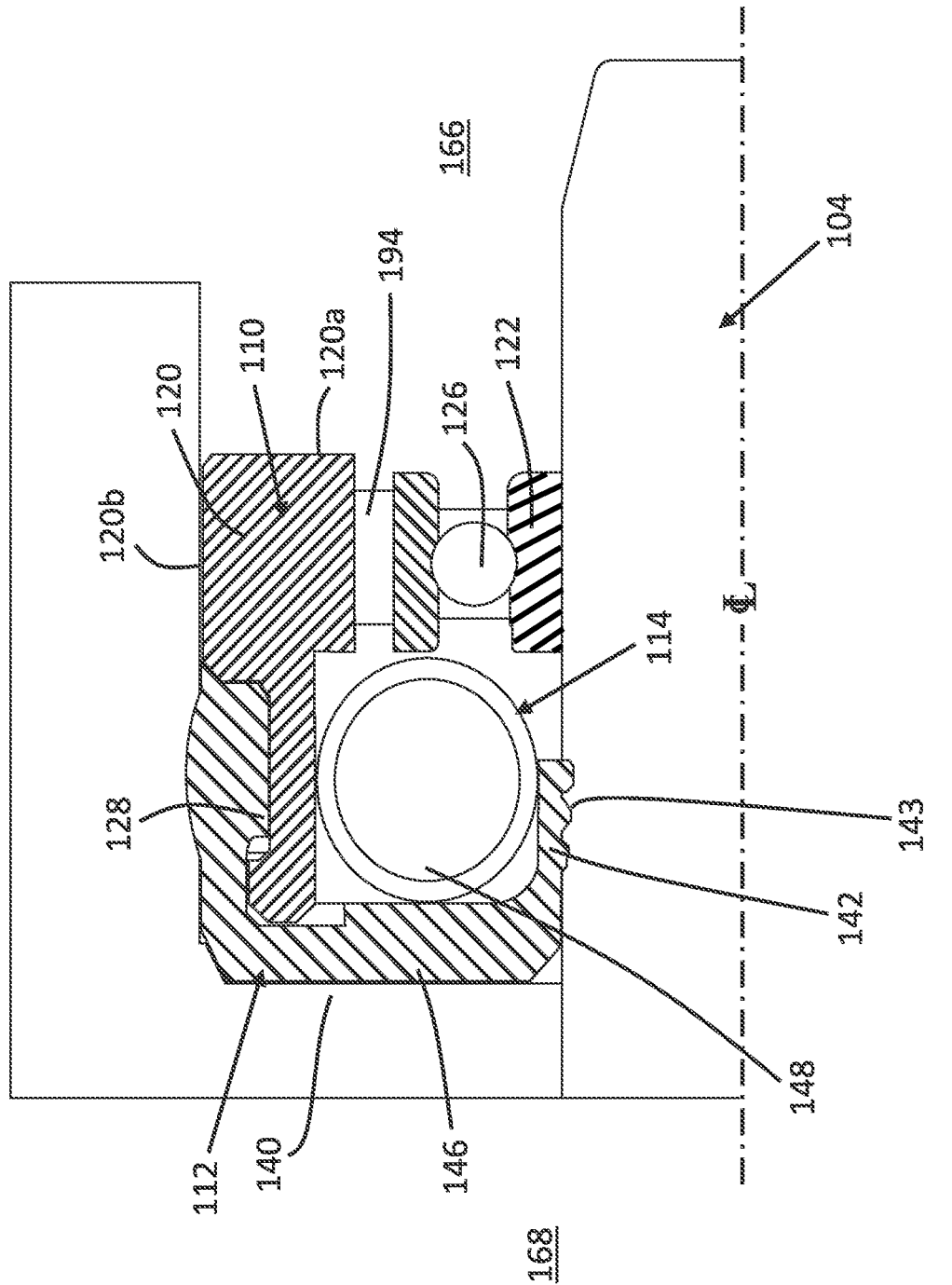
FIG. 6 is a schematic cross-sectional side view of an integrated seal and bearing assembly located outside of a gland in accordance with still further aspects of the invention.

With reference now to FIG. 6, an ISB assembly 100 in accordance with further aspects of the invention is shown, which is similar to the ISB assembly 100 of FIGS. 1 and 5 with a few exceptions or differences. In the present embodiment, the outer ring 120 of the bearing assembly 110 has an extending flange 128 that projects into the cavity 148 of the sealing element 140 and mechanically engages with the outside flange 144, such as in a latching engagement or locking engagement. The outer flange 128 can have a shaped lower surface with an angled end section for confining the position of the coils of the canted coil spring 114, similar to that of FIG. 5. As shown, the lower surface of the outer flange 128 is generally planar.

In an example, the outer ring 120 has a vertical ring section 120a that extends from a generally horizontal ring section 120b and has a connecting corner with surfaces that are approximately at right angle, on the side adjacent the energizer 114. The vertical ring section 120a enables the ISB assembly designer to select the desired gap between the vertical ring section 120a and the inner ring 122, which can vary with the desired ball size and cage. As shown, a plurality of through holes 194 (only one shown) are provided through the vertical ring section 120a. In an example, two or more through holes or passages 194 are provided in the vertical ring section 120a of the outer ring. In other examples, there can be more than two through holes, such as three, four, five, or more than five through holes. Less preferably, only one through hole is provided through the vertical ring section 120a.

Each through hole or passage 194 has two open ends and a passage to enable fluid to pass from a first side of the vertical ring section 120a to a second side of the vertical ring section. In use, pressure from the high pressure region 166 can pass through the plurality of through holes 194 to equalize pressure across the bearing assembly. Further, as pressure is equalized in the cavity space 148 of the seal element 140, fluid pressure aids to further bias the inner flange 142 against the shaft surface to increase the sealing pressure of the inner flange 142 against the shaft surface. The inner flange 142 can have a long dynamic sealing lip 143 or a short dynamic sealing lip.

Figure 7:
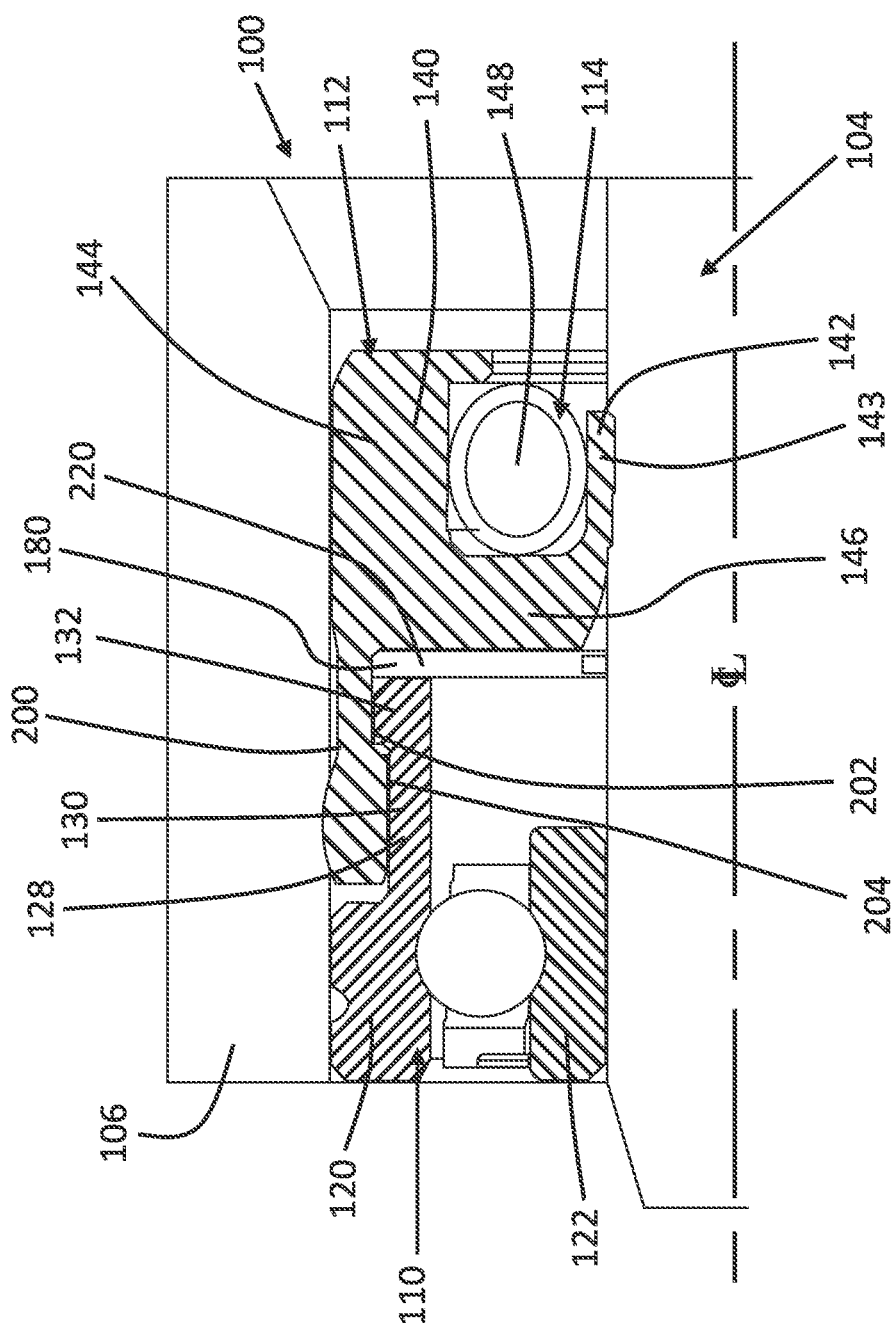
FIG. 7 is a schematic cross-sectional side view of an integrated seal and bearing assembly located in a gland in accordance with still further aspects of the invention.

With reference now to FIG. 7, an ISB assembly 100 in accordance with further aspects of the invention is shown. The present ISB assembly 100 is similar to the ISB assemblies of FIGS. 1 and 3 with a few exceptions or differences. In the present embodiment, the outer ring 120 comprises an extended flange 128 that has both a base 130 and a bump 132 defining a detent for engaging a corresponding detent on the seal assembly, as further discussed below.

In the present embodiment, the seal assembly 112 does not incorporate an internal channel with complementary surfaces for engaging the detent of the extended flange 128. Instead, a sealing extended flange 200 is provided with the sealing element 140. As shown, the scaling extended flange 200 extends from the center channel section 146 in the axial direction, axially relative to the lengthwise axis of the shaft 104. The sealing extended flange 200 can extend towards the bearing assembly 110 and away from the cavity 148. The sealing extended flange 200 comprises a base 202 and a bump 204 defining a detent having complementary surfaces for engaging the detent of the extended flange 128 of the bearing assembly 110. Thus, in the present embodiment, the seal assembly 112 directly contacts and engages the bearing assembly 110 and wherein each of the two assemblies comprises an extended flange with a detent.

To adjust the size and shape of the cavity 148 of the sealing element 140 for accommodating an energizer of desired size, the outer flange 144 can be made relative thicker than the inside flange 142. Having a relatively thinner inside flange 142 allows the inside flange to flex with the shifting shaft, such as when the shaft vibrates up and down, and maintain the dynamic seal. With the ability to adjust the thickness of the outer flange 144, different sized spring energizers can be used with the ISB assembly.

In an example, a support plate 220 is included with the seal assembly and is provided between the seal element 140 and the bearing assembly 110. The support plate 220, when incorporated, can have an outside diameter and an inside diameter, and wherein the inside diameter defines an opening for accommodating the shaft 104. The opening should have enough clearance to easily mount over the shaft. In an example, the support plate 220 is a metallic washer and wherein the thickness of the support plate can be a variable to fit within the space between the center channel section 146 of the seal element 140 and the end of the extended flange 128. In another example, the support plate 220 is made from a non-metallic material, such as engineered plastic or other appropriate non-metallic material appropriate for the application. The support plate 220 has a support wall 180 for supporting the seal element 140, and specifically the center channel section of the seal element, from high pressure extrusion. The support plate 220 abuts the rigid extended flange 128 to provide a rigid support wall 180 to support the seal element from high pressure extrusion, in the direction of the bearing assembly 110.

Figure 8:
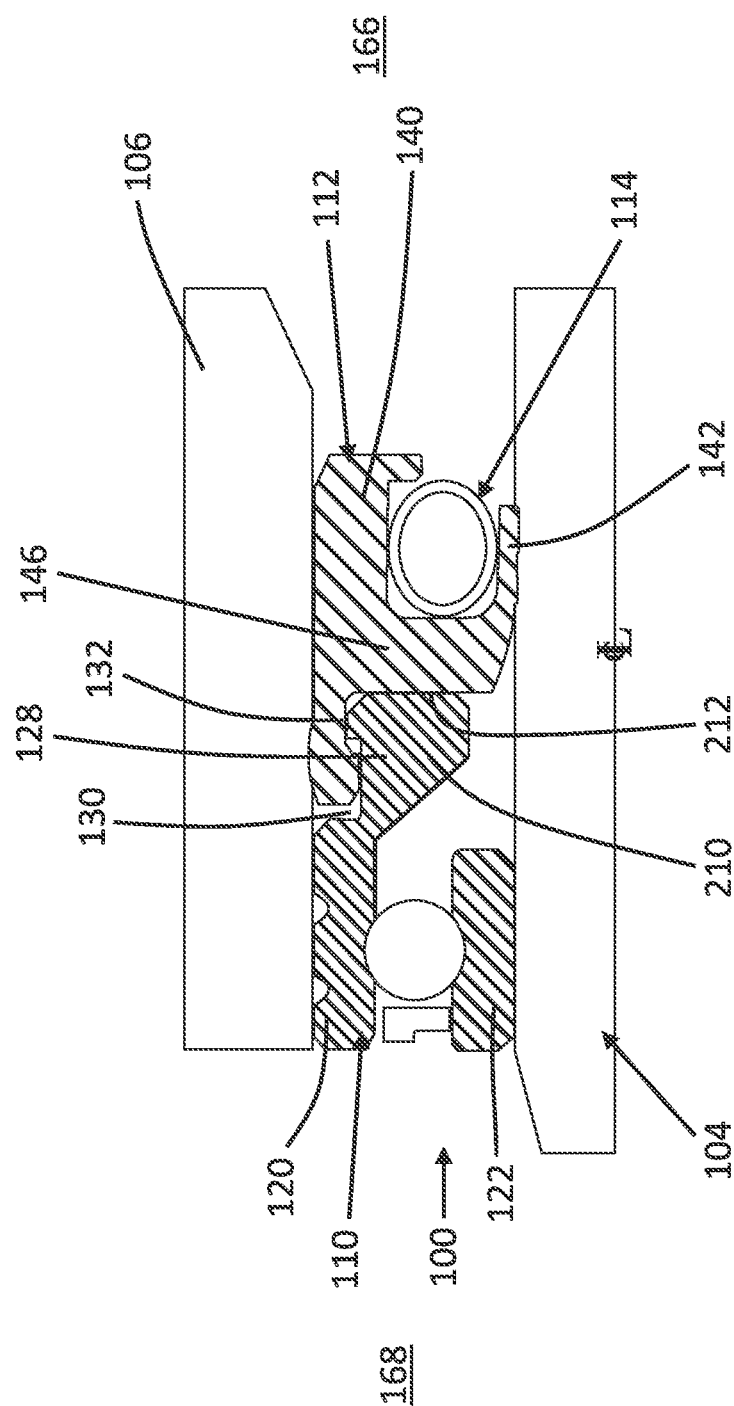
FIG. 8 is a schematic cross-sectional side view of an integrated seal and bearing assembly located in a gland in accordance with still further aspects of the invention.

With reference now to FIG. 8, an ISB assembly 100 in accordance with further aspects of the invention is shown, which is similar to the ISB assembly 100 of FIG. 7 with a few exceptions or differences. In the present embodiment, the extended flange 128 of the outer ring 120 of the bearing assembly 110 is provided with an enlarged end 210 having an extended end edge 212. In the example shown, the extended end edge 212 contacts the center channel section 146 of the seal assembly 112 to support the seal assembly from high pressure extrusion. Thus, the extended end edge 212 of the enlarged end 210 of the extended flange 128 acts like a support wall of other ICB assemblies discussed elsewhere herein.

Exemplary claims and exemplary subject matter that can be claimed in accordance with aspects of the invention include the following:

An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity; and
an extended flange extending from the outer ring and projecting into an internal channel of the seal element, which is spaced from the cavity.

An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity; and
an intermediate ring comprising a body comprising a first ring end and a second ring end defining an extended flange, the extended flange of the intermediate ring projecting into an internal channel of the seal element, which is spaced from the cavity.

An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity; and
an extended flange extending from the outer ring and projecting into the cavity.

An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity;
an extended flange extending from the outer ring engaging a sealing extended flange extending from the sealing element.

An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity;
an extended flange extending from the outer ring engaging a sealing extended flange extending from the sealing element, the extended flange of the outer ring being spaced from the center channel section by a gap; and
a support plate separately formed from the bearing assembly and the sealing element located at least partly in the gap.

Broadly speaking, a claim can include an integrated seal and bearing assembly comprising a seal assembly having a seal element with a cavity and a bearing element having an inner ring and an outer ring with a plurality of rotating elements located therebetween, wherein the bearing assembly and the seal assembly are directly or indirectly connected to one another via complementary detent surfaces. If indirectly connected, an intermediate ring can be located between the seal element and the baring element and is in contact with both the sealing element and the bearing element. The intermediate ring mechanically connects to the seal element of the seal element.

A still further aspect of the invention is a method of using an integrated seal and bearing assembly as shown and described.

A still further aspect of the invention is a method of manufacturing or making an integrated seal and bearing assembly as shown and described.

Methods of making and of using integrated seal and bearing assemblies and components thereof are within the scope of the present invention.

Although limited embodiments of integrated seal and bearing assemblies and their components have been specifically described and illustrated herein, many modifications and variations will be apparent to those skilled in the art. For example, the various dynamic sealing lips can be made long or short, the thickness of the outer and inner flanges of the sealing elements can vary, the energizer type can be other than a canted coil spring, the shape of the elements can vary, the size of the rolling elements can vary, the size of the energizer can vary, the length of the support wall can vary, the length of the extended end edge can vary, and the use of materials can vary. Furthermore, it is understood and contemplated that features specifically discussed for one integrated seal and bearing assembly embodiment may be adopted for inclusion with another integrated seal and bearing assembly embodiment, provided the functions are compatible. Accordingly, it is to be understood that the integrated seal and bearing assemblies and their components constructed according to principles of the disclosed device, system, and method may be embodied other than as specifically described herein. The disclosure is also defined in the following claims.

What is claimed is:
1. An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity;
an energizer located in the cavity and biasing against the inside flange and the outside flange;
wherein the outer ring and the sealing element are mechanically engaged to one another;
wherein an extended flange extending from the outer ring and projecting into an internal channel of the seal element, which is spaced from the cavity; and
wherein a support wall extending from the extended flange and contacting the center channel section of the sealing element.

2. The integrated seal assembly of claim 1 wherein the extended flange comprises a detent engaging the outside flange of the sealing element.

3. The integrated seal and bearing assembly of claim 1, wherein the energizer is a canted coil spring.

4. An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity;
an energizer located in the cavity and biasing against the inside flange and the outside flange, or biasing against the inside flange and an extended flange extending from the outer ring that projects into the cavity so that the outer ring and the sealing element are mechanically engaged to one another; and
an intermediate ring comprising a body comprising a first ring end and a second ring end defining an extended flange, the extended flange of the intermediate ring projecting into an internal channel of the seal element, which is spaced from the cavity.

5. The integrated seal and bearing assembly of claim 4, wherein the energizer located in the cavity is a canted coil spring.

6. The integrated seal assembly of claim 4, further comprising a support wall extending from the second ring end and contacting the center channel section of the sealing element.

7. The integrated seal assembly of claim 4, wherein the outer ring is fitted into the first ring end of the intermediate ring.

8. The integrated seal assembly of claim 4, wherein the extended flange comprises a detent engaging the outside flange of the sealing element.

9. The integrated seal assembly of claim 4, wherein the energizer is a canted coil spring.

10. An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity;
an energizer located in the cavity and biasing against the inside flange and the outside flange, or biasing against the inside flange and an extended flange extending from the outer ring and projecting into the cavity;
wherein the outer ring and the sealing element are mechanically engaged to one another;
wherein the outer ring comprises a vertical ring section extending from a horizontal ring section, and wherein the rolling elements contact the vertical ring section of the outer ring.

11. The integrated seal assembly of claim 10, wherein at least one through hole comprising two open ends is located in the vertical ring section of the outer ring.

12. An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity;
an energizer located in the cavity and biasing against the inside flange and the outside flange, or biasing against the inside flange and an extended flange extending from the outer ring and projecting into the cavity;
wherein the outer ring and the sealing element are mechanically engaged to one another;
wherein the energizer is biasing against the inside flange and the outside flange and further comprising an extended flange extending from the outer ring engaging a sealing extended flange extending from the sealing element.

13. The integrated seal and bearing assembly of claim 12, wherein the energizer located in the cavity of the sealing element is a canted coil spring.

14. The integrated seal and bearing assembly of claim 12, wherein the extended flange comprises an enlarged end with an extended end edge.

15. The integrated seal and bearing assembly of claim 14, wherein the center channel section contacts the extended end edge.

16. An integrated seal and bearing assembly comprising:
an outer ring defining an outside diameter of a bearing assembly, an inner ring defining an inside diameter of the bearing assembly, a cage retaining a plurality of rolling elements with said rolling elements contacting the outer ring and the inner ring;
a sealing element comprising an outside flange, an inside flange and a center channel section connecting the inside flange and the outside flange, the outside flange, the inside flange, and the center channel section defining a cavity;
an energizer located in the cavity and biasing against the inside flange and the outside flange, or biasing against the inside flange and an extended flange extending from the outer ring and projecting into the cavity;
wherein the outer ring and the sealing element are mechanically engaged to one another;
wherein the energizer is biasing against the inside flange and the outside flange and further comprising an extended flange extending from the outer ring engaging a sealing extended flange extending from the sealing element, the extended flange of the outer ring being spaced from the center channel section by a gap; and a support plate separately formed from the bearing assembly and the sealing element located at least partly in the gap.

17. The integrated seal and bearing assembly of claim 16, wherein the support plate comprises an outside diameter and an inside diameter defining an opening.

18. The integrated seal and bearing assembly of claim 16, wherein the support plate contacts both the extended flange of the bearing assembly and the center channel section of the sealing element.

* * * * *